(12) United States Patent
Hoh

(10) Patent No.: US 10,465,720 B2
(45) Date of Patent: Nov. 5, 2019

(54) VALVE

(71) Applicant: ZF Friedrichshafen AG, Friedrichshafen (DE)

(72) Inventor: Michael Hoh, Wolfegg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 15/737,840

(22) PCT Filed: May 30, 2016

(86) PCT No.: PCT/EP2016/062140
§ 371 (c)(1),
(2) Date: Dec. 19, 2017

(87) PCT Pub. No.: WO2016/206918
PCT Pub. Date: Dec. 29, 2016

(65) Prior Publication Data
US 2018/0202470 A1    Jul. 19, 2018

(30) Foreign Application Priority Data
Jun. 23, 2015   (DE) .................. 10 2015 211 599

(51) Int. Cl.
*F15B 13/02*    (2006.01)
*G05D 16/10*    (2006.01)
(Continued)

(52) U.S. Cl.
CPC ............ *F15B 13/024* (2013.01); *F16D 48/02* (2013.01); *F16K 17/06* (2013.01); *G05D 16/103* (2013.01);
(Continued)

(58) Field of Classification Search
CPC .............. F15B 13/024; F16D 48/02; F16D 2048/0209; F16K 17/02; F16K 17/06;
(Continued)

(56) References Cited

U.S. PATENT DOCUMENTS 2,526,361 A * 10/1950 Johnson .............. F15B 13/0402
137/625.25
3,381,698 A    5/1968 Hayner et al.
(Continued)

FOREIGN PATENT DOCUMENTS

DE    1 500 231    7/1971
DE    34 35 969 A1    5/1985
(Continued)

OTHER PUBLICATIONS

German Search Report Corresponding to 10 2015 211 599.2 dated Mar. 7, 2016.
(Continued)

*Primary Examiner* — Craig J Price
(74) *Attorney, Agent, or Firm* — Davis & Bujold PLLC; Michael J. Bujold

(57) ABSTRACT

A valve (1) having a valve housing (2) with at least one supply connection (P), a working connection (A) and an outlet opening (T), as well as a valve piston (3) that is arranged and able to move axially within the valve housing (2). The outlet opening (T) provided in the valve housing (2) has at least first and second control edges (4, 5).

11 Claims, 3 Drawing Sheets

(51) Int. Cl.
*G05D 16/20* (2006.01)
*F16D 48/02* (2006.01)
*F16K 17/06* (2006.01)

(52) U.S. Cl.
CPC . *G05D 16/2093* (2013.01); *F16D 2048/0209* (2013.01)

(58) Field of Classification Search
CPC .............. G05D 16/103; G05D 16/2093; Y10T 137/86493–86895
USPC ......................... 137/625–625.5; 251/205–209
See application file for complete search history.

(56) References Cited

U.S. PATENT DOCUMENTS

| | | | | |
|---|---|---|---|---|
| 3,472,281 A | * | 10/1969 | Chiba et al. | F15B 13/04 137/625.69 |
| 3,477,344 A | * | 11/1969 | Fisher | F15B 13/0402 137/625.66 |
| 3,570,533 A | * | 3/1971 | Hamilton | F15C 3/02 137/559 |
| 3,902,526 A | * | 9/1975 | Brake | F15B 13/0431 137/625.5 |
| 5,186,213 A | * | 2/1993 | Urata | F15B 13/0402 137/596.15 |
| 5,327,800 A | * | 7/1994 | Van Selous | F16H 61/0286 137/593 |
| 7,559,336 B2 | | 7/2009 | Müller et al. | |
| 2007/0131291 A1 | * | 6/2007 | Lee | F15B 13/0402 137/625.69 |
| 2014/0263825 A1 | * | 9/2014 | Heverly, II | F16F 15/0275 244/60 |
| 2015/0377369 A1 | * | 12/2015 | Que | F16K 11/0708 137/625.34 |

FOREIGN PATENT DOCUMENTS

| | | |
|---|---|---|
| DE | 40 25 578 A1 | 2/1991 |
| EP | 2 375 083 A2 | 10/2011 |
| EP | 2 837 832 A1 | 2/2015 |
| WO | 2006/050684 A1 | 5/2006 |

OTHER PUBLICATIONS

International Search Report Corresponding to PCT/EP2016/062140 dated Aug. 19, 2016.
Written Opinion Corresponding to PCT/EP2016/062140 dated Aug. 19, 2016.

* cited by examiner

VALVE

This application is a National Stage completion of PCT/EP2016/062140 filed May 30, 2016, which claims priority from German patent application serial no. 10 2015 211 599.2 filed Jun. 23, 2015.

FIELD OF THE INVENTION

The present invention relates to a valve.

BACKGROUND OF THE INVENTION

In the prior art, in automatic or automated motor vehicle transmissions, mechanically driven pressure medium pumps are usually used for supplying the transmission and for controlling the shifting elements. If for the supply of the transmission and the control of the shifting elements pressure medium pumps with a constant delivery volume are used, then the delivery volume of the pressure medium pump is in a fixed ratio to the drive rotational speed of the pressure medium pump, which corresponds for example to a transmission input rotational speed if the pressure medium pump is arranged on a transmission input shaft.

The design of a hydraulic or pneumatic system supplied by a pressure medium pump with a constant delivery volume is intended to meet the demand of the largest individual consumer or, if a plurality of individual consumers are to be actuated together, then if necessary to meet the demands of them all. By virtue of the constant delivery volume of the pressure medium pump, the pressure build-up related to the drive rotational speed of the pressure medium pump is therefore predetermined for other consumers in the hydraulic or pneumatic system.

For that reason, in the prior art pressure-limiting valves are known, which open if a certain pressure in the main system is exceeded in order to divert the surplus pumped medium through a bypass. It is also known to limit the pressure of the medium being delivered to a specifiable maximum value already on the input side of the consumer points or even in the supply line to the consumer points. This is particularly necessary when the consumer points contain mechanically sensitive components which, if the maximum pressure is exceeded, would either be damaged or would wear more rapidly. Such a maximum pressure-limitation system is for example also necessary in lubricant systems in which, before the actual consumer point, an oil filter or the like is connected which should also not be acted upon by too high a pressure so as not to be damaged.

Flow valves, such as throttle valves or diaphragm valves, reduce the pressure in a system to a set value. Such valves are used in order to supply part of a hydraulic or pneumatic system with a lower pressure. Thus for example, the throttling of the fluid at the throttle point causes the pressure in a secondary circuit to be lower than in a main circuit of the hydraulic or pneumatic system.

By means of conventional pressure-limiting valves the system pressure can only be limited upward, whereas by means of flow valves the system pressure in the line after the valve can only be reduced overall. Limiting the system pressure by means of a pressure-limiting valve when the pump rotational speed is high can result in undersupplying the hydraulic or pneumatic system, whereas reducing the system pressure by means of a flow valve when the pump rotational speed is low can also result in undersupplying the hydraulic or pneumatic system. Thus, in hydraulic or pneumatic systems with a pressure medium pump with a constant delivery volume, designing the system for consumers which have to be supplied but have lower priority in the system is problematic.

From DE 40 25 578 A1 a control valve for flow or pressure regulation is known, in which the pressure medium inlet and the pressure medium outlet communicate with one another. The control piston has two control edges, one of the two control edges co-operating with a control opening and the other of the two control edges co-operating with a safety bore. Depending on the axial position of the control piston, the oil line on the inlet side communicates with the oil lines on the outlet side via a variable free cross-section of the control opening and the safety bore.

SUMMARY OF THE INVENTION

The purpose of the present invention is to provide a valve which enables improved control of consumers in a hydraulic or pneumatic system.

This objective is achieved by a valve having the characteristics specified the independent claim. Advantageous features emerge from the subordinate claims, the description and the drawings.

The valve according to the invention comprises a valve housing with at least one supply connection, a working connection and an outlet opening. In the valve housing is arranged an axially movable or longitudinally displaceable valve piston. According to the invention, the outlet opening provided in the valve housing has at least two control edges.

The valve piston that can move axially in the valve housing has at least one piston collar with at least one control edge. In a defined initial position of the valve piston, hereinafter called the rest position, the outlet opening provided in the valve housing is completely blocked by the piston collar of the valve piston. The rest position of the valve piston in the valve housing is reached by virtue of the action of a force on the valve piston or on the piston collar of the valve piston, hereinafter called the counterforce. The counterforce acts in opposition to the actuation direction of the valve piston and can for example be applied by a spring element or by means of hydraulic or pneumatic pressure.

To actuate the valve it can be acted upon by a control pressure, which applies a corresponding actuating force on the valve piston. If the actuating force due to the control pressure exceeds the counterforce acting on the valve piston or the piston collar of the valve piston, the valve piston is moved axially in the valve housing. If a first control pressure level is exceeded, the valve piston in the valve housing is moved to a position such that the at least one control edge of the piston collar of the valve piston moves clear of the first control edge of the outlet opening, whereas if a second control pressure level is exceeded, the valve piston in the valve housing moves to a position such that the at least one control edge of the piston collar of the valve piston moves clear of the second control edge of the outlet opening as well. If a third control pressure level is reached, then finally the valve piston or the piston collar of the valve piston comes in contact with an end position of the valve housing.

The through-flow cross-section of the outlet opening which is left open after the first control edge has been passed and until the second control edge of the outlet opening is reached, definitively determines the further pressure increase at the working connection of the valve. The through-flow cross-section between the two control edges of the outlet opening and the counterforce acting on the valve piston are matched to one another in such manner that a desired working pressure prevails at the working connection of the valve.

Thus, in a first embodiment the through-flow cross-section between the first and second control edges can be of uniform shape, for example rectangular or slot-shaped.

In a second embodiment, in contrast, the through-flow cross-section between the first and second control edges can be of non-uniform shape, for example trapezoidal, triangular or circular.

In one embodiment the outlet opening provided in the valve housing and having at least two control edges has a single shape, for example it is L-shaped or T-shaped. In another embodiment the outlet opening in the valve housing can consist of a plurality of bores. For example, the multi-bore outlet opening can consist of a plurality of holes arranged at the circumference of the valve housing in such manner that an outlet opening with at least two control edges is formed.

In a further embodiment, between the first control edge and the second control edge of the outlet opening at least one further control edge can be provided, such that the through-flow cross-section of the outlet opening between the first control edge and the second control edge can for example be stepped.

In a preferred embodiment of the valve, the valve piston has a second piston collar which, together with the first piston collar, forms a valve chamber into the area of which the supply connection and the working connection open.

Thus, depending on the actuation position of the valve piston, the valve according to the invention enables various valve functions. For example, in a first adjustment position of the valve piston a system pressure applied at the supply connection of the valve can be transmitted almost in full to the working connection of the valve. In a second adjustment position of the valve piston, a first cross-section area of the outlet opening provided in the valve housing is left clear, such that part of the system pressure applied at the supply connection of the valve flows away through the first cross-section area to a pressure medium sink and a reduced volume flow or a reduced pressure level prevails at the working connection of the valve. In a third adjustment range, in addition to the first cross-section area, a second cross-section area of the outlet opening provided in the valve housing is left clear. This increases the volume flowing away into the pressure medium sink and the volume flow prevailing at the working connection of the valve, or the pressure level prevailing at the working connection of the valve, is limited to a maximum value. By virtue of the pressure limitation, any overpressure peaks that occur in the system can be suppressed.

Besides the above, the invention concerns a hydraulic or pneumatic system, in particular for the hydraulic or pneumatic supply and control of an automatic or automated vehicle transmission, which system comprises at least one pressure medium pump, a hydraulic or pneumatic consumer and at least one valve as described above. All the designs of the valve according to the invention can correspondingly also be used in a hydraulic or pneumatic system that contains a corresponding valve. The at least one hydraulic or pneumatic consumer is connected to the working connection of the above-described valve, whereby a volume flow to the hydraulic or pneumatic consumer can be adjusted by means of the valve. The pressure medium pump, which is designed as a pressure medium pump with a constant delivery volume, delivers a volume flow that depends on the rotational speed of the pump to the supply connection of the valve. The control pressure by means of which the valve is actuated depends on the rotational speed of the pressure medium pump. The higher the rotational speed of the pressure medium pump is, the higher the control pressure acting on the valve piston and the larger the displacement of the valve piston away from its rest position is. By using the above-described valve in a hydraulic or pneumatic system, both a throttle valve or diaphragm valve and a pressure-limiting valve can be dispensed with in the hydraulic or pneumatic system.

Furthermore, the invention also relates to a transmission 18 for a motor vehicle 20, which comprises a valve or a hydraulic or pneumatic system as described, and a motor vehicle having such a transmission.

BRIEF DESCRIPTION OF THE DRAWINGS

Below, the invention—which can be realized in several embodiments—is explained in more detail with reference to examples illustrated in the drawings, which show.

DETAILED DESCRIPTION OF THE PREFERRED EMBODIMENTS

Figure 1A:
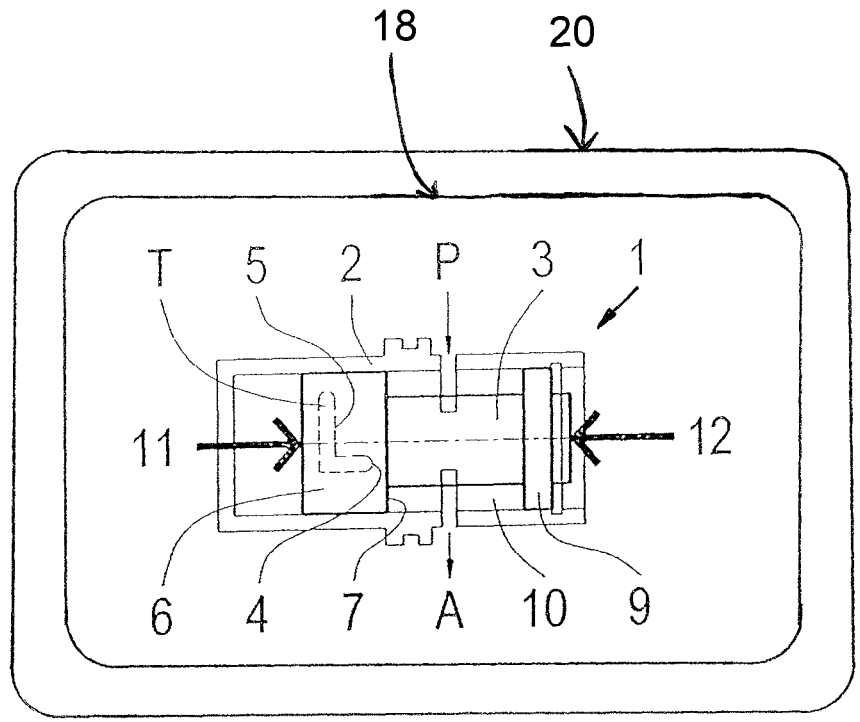
FIGS. 1*a*) to *d*): Schematic representations of a valve in various actuation positions.

FIG. 1*a*) shows a schematic representation of an embodiment according to the invention, of the valve 1 in its rest position. The valve 1 shown here is designed as a slide valve or longitudinal slide valve. In a cylindrical bore of a valve housing 2, which can for example be in the form of a valve sleeve, a valve piston 3 with a first piston collar 6 and a second piston collar 9 is guided so that it can move axially. A control edge 7 is formed on the first piston collar 6. The valve housing 2 has a supply connection P, a working connection A and an outlet opening T with a first control edge 4 and a second control edge 5. As shown in FIG. 1*a*) the outlet opening T is L-shaped.

In this case the two piston collars 6, 9 of the valve piston 3 have equal diameters and form a valve chamber 10 into the area of which the supply connection P and the working connection A open. The valve 1 can be flowed through by a system pressure applied at the supply connection P, which pressure is then available at the working connection A of the valve 1 as a working pressure. Since the two piston collars 6, 9 have the same diameter, in the valve chamber 10 the pressure forces acting on the piston collars 6, 9 cancel one another out when a volume flow is passing through the valve 1.

On the piston surface of the first piston collar 6 that faces away from the valve chamber 10 there acts a counterforce 11, by virtue of which the valve piston 3 or its second piston collar 9 rests for example against a circlip when the valve 1 is not actuated and is positioned in its rest position in the valve housing 2. The counterforce 11 acts in opposition to the actuation direction of the valve piston 3 and can be produced, for example, by means of a spring element (not shown here) or by the action of a hydraulic or pneumatic pressure. To actuate the valve 1 it can be acted upon by a control pressure 12 which produces a corresponding actuating force on the valve piston. If the actuating force produced by the control pressure 12 exceeds the counterforce 11 acting on the valve piston 3 or its first piston collar 6 and, in addition, overcomes the friction forces between the piston collars 6, 9 and the valve housing 2, then the valve piston 3 is moved axially within the valve housing 2. As shown in FIGS. 1a) to 1d), an action of the control pressure is in a direction coaxial with the movement of the valve piston within the valve housing.

If the control edge 7 of the piston collar 6 is in a position between the rest position and the first control edge 4 of the outlet opening T, then the outlet opening T is completely blocked by the first piston collar 6 and a volume flow at the supply connection P is almost completely passed on to the working connection A of the valve 1. In this case only slight losses due to valve leakage can reduce the volume flow, and any leakage drains away through the outlet opening T. A consumer connected to the working connection A of the valve 1 can therefore be acted upon by an almost unrestricted volume flow.

Figure 1B:
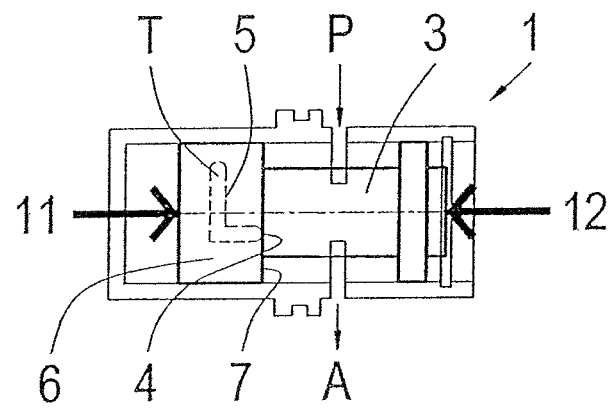

FIG. 1b) shows a schematic representation of the valve 1 in a position in which the control edge 7 of the first piston collar 6 coincides with the first control edge 4 of the outlet opening T. If a control pressure 12 now acts upon the valve piston 3, by which the valve piston 3 is moved farther in its actuation direction, then the first control edge 7 of the first piston collar 6 moves clear of the outlet opening T. Part of the volume flow at the supply connection P then passes through the free cross-section of the outlet opening T into a pressure medium sink (not shown here) and the volume flow at the working connection A of the valve 1 is correspondingly reduced. Thus, a consumer connected to the working connection A of the valve 1 can be acted upon by a reduced working pressure. So the valve according to the invention acts like a flow valve known from the prior art, by means of which a system pressure can be reduced to a working pressure.

The through-flow cross-section of the outlet opening T exposed after the first control edge 4 has been passed and until the second control edge 5 has been passed, decisively determines the further pressure rise at the working connection A of the valve 1. Accordingly, the exposed through-flow cross-section between the two control edges 4 and 5 of the outlet opening T and the counterforce 11 acting on the valve piston 3 have to be matched to one another in such manner that a desired, reduced working pressure is produced at the working connection A of the valve 1.

Figure 1C:
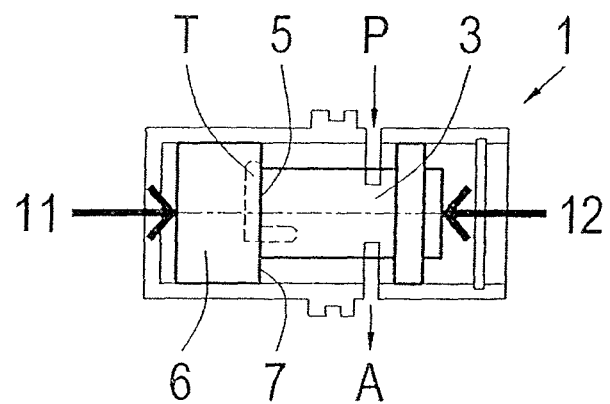

FIG. 1c) shows a schematic representation of the valve 1 in a position in which the control edge 7 of the first piston collar 6 coincides with the second control edge 5 of the outlet opening T. If now the valve piston 3 is acted upon by a control pressure 12 by which the valve piston 3 is moved farther in its actuation direction, then the control edge 7 of the piston collar 6 moves clear of the second control edge 5 of the outlet opening T if the control pressure 12 is increased only slightly. The cross-section of the outlet opening T then grows rapidly, so that the volume flow passing through the outlet opening T increases considerably and the volume flow or working pressure at the working connection A of the valve 1 is limited to a maximum value. Thus, the valve 1 according to the invention acts here like a pressure-limiting valve known from the prior art, by means of which a system pressure can be limited.

Figure 1D:
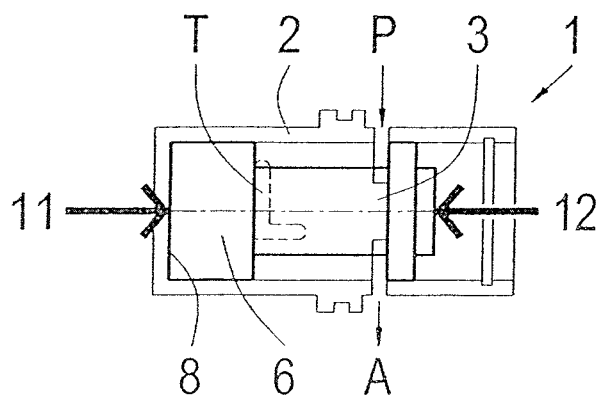

When a third control pressure level is applied, the valve piston 3 or the first piston collar finally comes into contact with an end-stop 8 on the valve housing 2, as shown in FIG. 1d).

Figure 2:
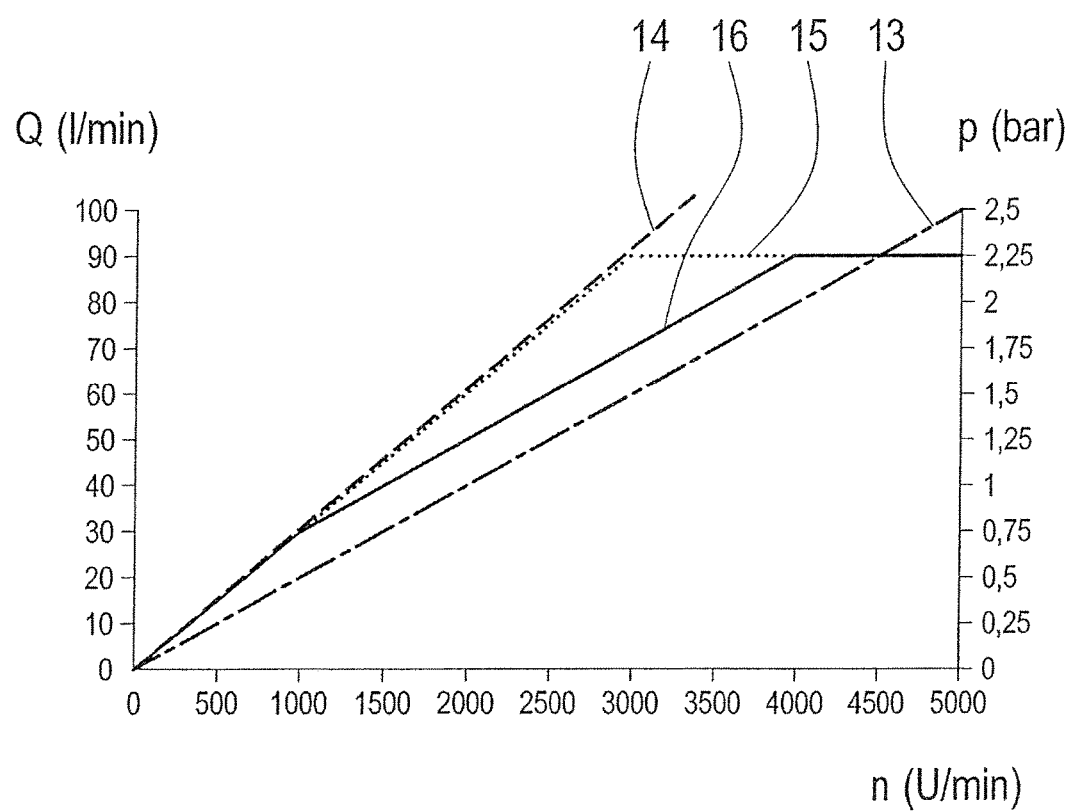
FIG. 2: A performance characteristic of the valve according to the invention.

The diagram in FIG. 2 shows, among other things, a volume flow Q produced by the pressure medium pump, expressed in l/min, plotted against the rotational speed n of the pump, expressed in R/min. The dot-dash line 13 shows that the volume flow Q delivered by the pressure medium pump is increased in proportion to the pump rotational speed n.

The broken characteristic line 14 shows as an example a system pressure prevailing at a supply connection P of the valve 1 described earlier. The system pressure depends on the demand of one or more main consumers provided in the hydraulic or pneumatic system and is produced by the constant delivery volume of a pressure medium pump as a function of the rotational speed n of the pump. The system pressure also increases in proportion to the increasing pump rotational speed n and results from a dynamic pressure present in the hydraulic or pneumatic system and from the volume flow Q delivered by the pressure medium pump.

The dotted characteristic line 15 shows as an example a pressure variation of the system pressure in a hydraulic or pneumatic system, which can be limited by a pressure-limiting valve known from the prior art. If at a pump rotational speed of approximately 3000 R/min a system pressure, in this case for example 2.25 bar, is reached or exceeded, then the surplus pumped medium drains away through a bypass and the system pressure has an upper limit.

For a secondary, further consumer provided in the hydraulic or pneumatic system, which is connected to the working connection A of the valve 1 according to the invention, the pressure variation is as shown by the continuous characteristic line 16.

Thus, up to a first pump rotational speed n1, which for example can be 1000 R/min, the secondary consumer is supplied at a minimum pressure, for example 0.75 bar, which until the pump rotational speed n1 is reached corresponds approximately to the system pressure prevailing at the supply connection of the valve 1. In this rotational speed range the outlet opening T in the valve housing 2 is fully blocked by the first piston collar 6 of the valve piston 3.

Between the first pump rotational speed n1 and a second pump rotational speed n2, which for example can be 4000 R/min, the secondary consumer is supplied with a working pressure lower compared with the unlimited system pressure 14, for example in the range 0.75 bar to 2.25 bar. In this rotational speed range the control edge 7 of the first piston collar 6 moves clear of the first control edge 4 of the outlet opening T and part of the volume flow at the supply connection P drains away through the cross-section of the outlet opening T so exposed.

At rotational speeds higher than the second pump rotational speed n2 the working pressure for the secondary consumer is limited for example to 2.25 bar. In this rotational speed range the control edge 7 of the first piston collar 6 moves clear of the second control edge 5 of the outlet opening T, so that a further increase of the working pressure is avoided.

All the figures given for the pump rotational speed, the volume flow Q, the system pressure and the working pressure should be regarded only as examples and are not intended to limit the invention. Rather, those with knowledge of the subject will realize that depending on the design of the hydraulic or pneumatic system and depending on the main and secondary consumers present in the hydraulic or pneumatic system, the corresponding values will vary. It is only the characteristic behavior of the valve 1 according to the invention that is relevant.

Besides supplying a consumer connected to the working connection A with a minimum pressure, the valve 1 described above also enables a pressure-reducing function and a pressure-limiting function. Thus, the pressure variation for a secondary consumer provided in a hydraulic or pneumatic system, which consumer is connected to the working connection A of the valve 1 described above, can be adjusted in a suitable manner.

INDEXES

1 Valve
2 Valve housing
3 Valve piston
4 First control edge of the outlet opening
5 Second control edge of the outlet opening
6 First piston collar of the valve piston
7 Control edge on the piston collar
8 End-stop
9 Second piston collar of the valve piston
10 Valve chamber
11 Control pressure
13 Volume flow
14 Characteristic line
15 Characteristic line
16 Characteristic line
A Working connection
P Supply connection
T Outlet opening

The invention claimed is:

1. A valve comprising:
a valve housing with at least one supply connection,
a working connection,
an outlet opening,
a valve piston being arranged and longitudinally/axially moveable within the valve housing by virtue of action of a control pressure, the action of the control pressure is in a direction coaxial with movement of the valve piston within the valve housing, and
the outlet opening, in the valve housing, having at least first and second control edges,
wherein, when a third control pressure level is applied, either the valve piston or a piston collar of the valve piston comes into contact with an end-stop in the valve housing.

2. The valve according to claim 1, wherein, between the first control edge and the second control edge, a through-flow cross-section of the outlet opening has a uniform shape.

3. The valve according to claim 1, wherein the outlet opening is L-shaped.

4. The valve according to claim 1, wherein the valve piston has at least one piston collar with at least one control edge, and the piston collar, in a defined initial position of the valve piston, completely blocks the outlet opening.

5. The valve according to claim 4, wherein the valve piston is located in the defined initial position by virtue of action of a force either on the valve piston or on the piston collar.

6. The valve according to claim 1, wherein when a first control pressure level is exceeded, at least one control edge of a piston collar of the valve piston moves clear of the first control edge of the outlet opening.

7. The valve according to claim 6, wherein when a second control pressure level is exceeded, the at least one control edge of the piston collar of the valve piston moves clear of the second control edge of the outlet opening.

8. The valve according to claim 1, wherein the valve piston has a second piston collar which, together with a first piston collar, forms a valve chamber into an area of which the supply connection and the working connection open.

9. A hydraulic or a pneumatic system having:
at least one pressure medium pump,
at least one hydraulic or pneumatic consumer, and
at least one valve comprising:
a valve housing with at least one supply connection,
a working connection,
an outlet opening,
a valve piston being arranged and longitudinally/axially moveable in the valve housing by virtue of action of a control pressure, and the action of the control pressure is in a direction coaxial with the movement of the valve piston within the valve housing,
the outlet opening in the valve housing having at least first and second control edges, and
the at least one valve controlling the at least one hydraulic or pneumatic consumer connected to the working connection of the valve,
wherein the valve piston interacts with the first control edge when a first control pressure level is applied, the valve piston interacts with the second control edge when a second control pressure level is applied, and either the valve piston or a piston collar of the valve piston comes into contact with an end-stop in the valve housing when a third control pressure level is applied.

10. A transmission comprising a valve having:
a valve housing with at least one supply connection,
a working connection,
an outlet opening, and
a valve piston arranged and longitudinally/axially moveable in the valve housing by virtue of action of a control pressure, and the action of the control pressure is in a direction coaxial with a movement of the valve piston within the valve housing,
the outlet opening in the valve housing having at least first and second control edges,
wherein the valve piston interacts with the first control edge when a first control pressure level is applied, the valve piston interacts with the second control edge when a second control pressure level is applied, and either the valve piston or a piston collar of the valve piston comes into contact with an end-stop in the valve housing when a third control pressure level is applied.

11. The transmission according to claim 10, wherein the transmission is incorporated into a motor vechile.

* * * * *